(12) United States Patent
Imashiro et al.

(10) Patent No.: US 6,214,940 B1
(45) Date of Patent: Apr. 10, 2001

(54) POLYACETAL RESIN COMPOSITION

(75) Inventors: Yasuo Imashiro; Naofumi Horie, both of Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/339,814

(22) Filed: Jun. 25, 1999

(30) Foreign Application Priority Data

Jul. 8, 1998 (JP) .................................................. 10-193289

(51) Int. Cl.[7] ....................................................... C08L 59/00
(52) U.S. Cl. .......................... 525/399; 525/398; 525/472; 525/473; 524/195; 524/593
(58) Field of Search ..................................... 525/472, 473, 525/398, 399; 524/195, 593

(56) References Cited

U.S. PATENT DOCUMENTS

| 4,293,469 | * | 10/1981 | Edelman | 525/398 |
| 4,582,869 | * | 4/1986 | Waggoner | 524/227 |
| 4,640,949 | * | 2/1987 | Wagman | 524/227 |
| 5,834,542 | * | 11/1998 | Kielhorn-Bayer | 524/195 |

FOREIGN PATENT DOCUMENTS

0117748 * 9/1984 (EP).
993600 * 5/1965 (GB).

* cited by examiner

*Primary Examiner*—Patricia A. Short
(74) *Attorney, Agent, or Firm*—Kubovcik & Kubovcik

(57) ABSTRACT

A polyacetal resin composition comprising a polyacetal resin and a polycarbodiimide compound. The polyacetal resin composition is free from the problems of conventional polyacetal resins and has good water resistance at high temperatures.

2 Claims, 1 Drawing Sheet

POLYACETAL RESIN COMPOSITION

BACKGROUND OF THE INVENTION

1. Field of the Invention

The present invention relates to a polyacetal resin composition. More particularly, the present invention relates to a polyacetal resin composition superior in water resistance at high temperatures.

2. Prior Art

Polyacetal resins are superior in mechanical strengths, sliding property, heat resistance, chemical resistance, moldability and electrical properties; therefore, they are used in wide applications as an engineering plastic. Polyacetal resins, however, are not fully satisfactory in acid resistance, adhesivity, coatability, printability, dyeability, weatherability, water resistance at high temperatures, etc. Hence, various studies have been made in order to alleviate these drawbacks of polyacetal resin.

In order to improve, for example, the adhesivity, coatability and dyeability of a polyacetal resin, it is effective to introduce a modifying group into the polyacetal resin to modify the polyacetal. As the method for improvement of polyacetal resin by introduction of such a modifying group thereinto, there were proposed, for example, a method (disclosed in JP-B-43-23467) of introducing an amino group by using aminoaldehyde as a comonomer; and a method (disclosed in JP-B47-19425) of using, as a comonomer, a nitro group-containing cyclic ether or cyclic acetal and reducing the nitro group to convert it into an amino group.

There were also proposed a method (disclosed in JPA-3-21618 and JP-A-3-21619) of producing a copolyacetal having hydroxyl group or the like, by using a comonomer; a method (disclosed in JP-A-5-25238) of copolymerizing a cyclic ether or cyclic formal having carboxyl group, amino group or the like, with trioxane; and a method (disclosed in JP-A-8-127631) of melt-kneading a polyacetal resin with a polymerizable compound to introduce a modifying group into the polyacetal resin.

Having good properties as mentioned above, polyacetal resins are used in the forms of, for example, miscellaneous clips including those for an electric wire, rivets for construction, miscellaneous screws including a radiator cock, gears, rollers, etc. In some cases, these members may be exposed to high temperatures and high humidities; however, there has been made no attempt of improving the high-temperature water resistance of polyacetal resin.

SUMMARY OF THE INVENTION

The object of the present invention is to provide a polyacetal resin which is free from the above-mentioned problems of the prior art and which has good water resistance at high temperatures.

According to the present invention, there is provided a polyacetal resin composition comprising a polyacetal resin and a carbodiimide compound.

DETAILED DESCRIPTION OF THE INVENTION

Figure 1:
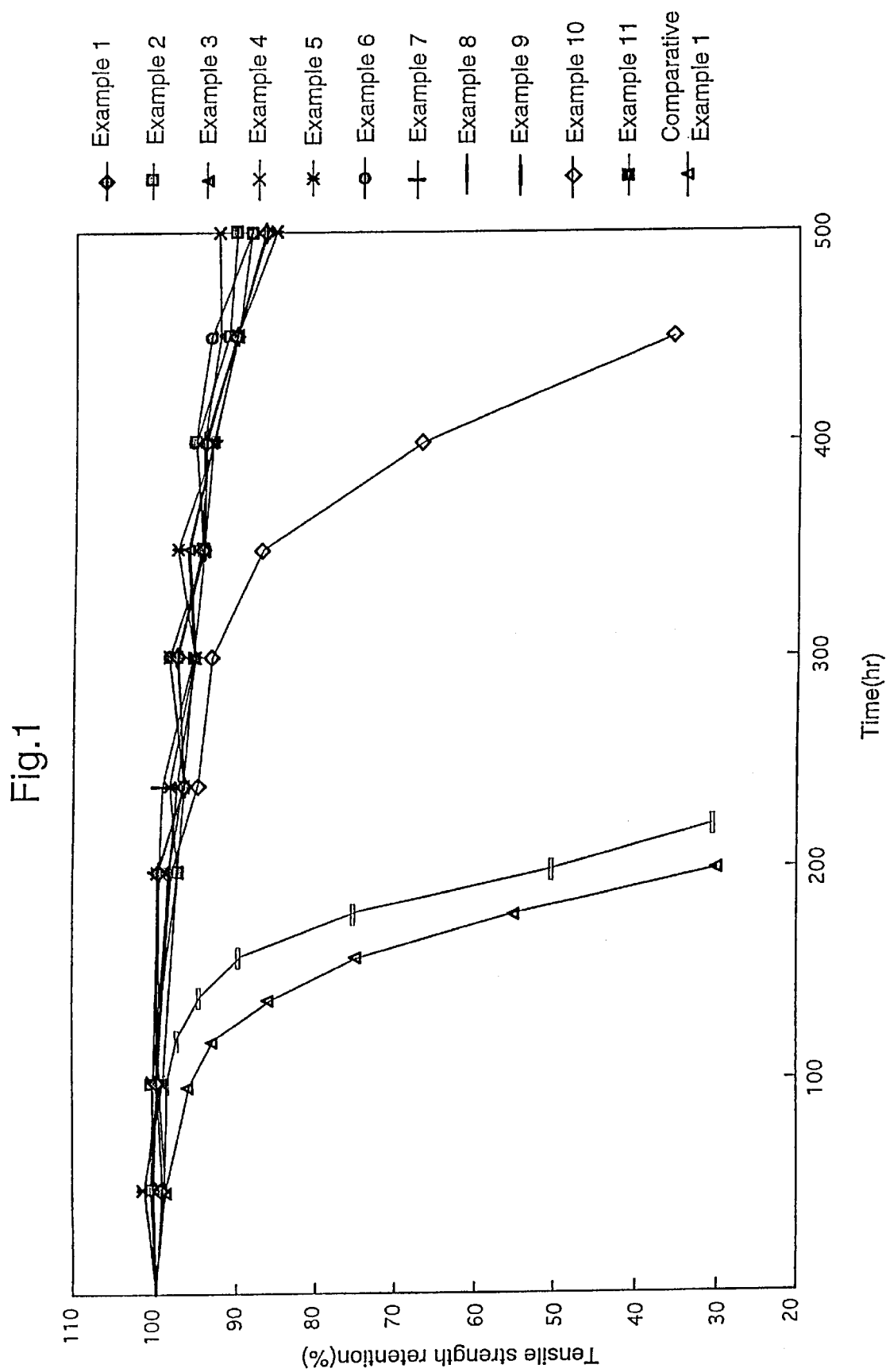
FIG. 1 is a graph showing relations between time and tensile strength retention (%), as measured for dumbbell specimens for tensile test.

The present invention is hereinafter described in detail.

The polyacetal resin (POM) used in the present invention is a polymer having oxymethylene (—$CH_2$—O—) group as the main constituent unit, and can be a polyoxymethylene homopolymer or a copolymer or terpolymer composed of oxymethylene group and other constituent unit(s). The present polyacetal resin may have a linear, branched or crosslinked molecular structure.

As the comonomer unit other than oxymethylene group, there can be mentioned oxyalkylene units having about 2 to 6 carbon atoms. As the polyacetal resin, there is preferred, in view of the thermal stability, a polyacetal copolymer, for example, a copolymer composed of at least oxymethylene unit and oxyethylene unit.

The polyacetal copolymer is ordinarily a random copolymer but may be a block copolymer, a graft copolymer or the like. Further, the polyacetal may be stabilized at the end by, for example, esterification with carboxylic acid (e.g. acetic acid, propionic acid or butyric acid).

There is no particular restriction as to the polymerization degree, etc. of the polyacetal resin, as long as the polyacetal resin has melt moldability.

The polyacetal resin can be produced, for example, by polymerizing an aldehyde (e.g. formaldehyde, paraformaldehyde or acetaldehyde) with a cyclic ether (e.g. trioxane, ethylene oxide, propylene oxide or 1,3-dioxolane).

The polyacetal resin used in the present invention may also be a modified polyacetal resin obtained by modifying a polyacetal resin or a polymerizable polyacetal resin having functional group having polymerizable unsaturated bond (e.g. ethylenically unsaturated bond), with a polymerizable compound having modifying group.

As the polymerizable polyacetal resin having functional group having polymerizable unsaturated bond, there can be mentioned a polymerizable polyacetal resin wherein the unsaturated group is at the random position of polyacetal resin, as a side chain, and a polymerizable polyacetal resin wherein the unsaturated group is at the end of polyacetal molecule.

As the modifying group of the polymerizable compound having modifying group, there can be mentioned epoxy group, carboxyl group, acid anhydride group, hydroxyl group, amide group, amino group, isocyanate group, etc.

The polymerizable compound having modifying group must have at least one polymerizable group in the molecule. Therefore, the polymerizable compound may have a plurality of polymerizable groups which may be the same kind or different kinds. The polymerizable compound used may be one kind or a combination of two or more kinds.

When fluidity is required, the polymerizable compound preferably has, in the molecule, one polymerizable group (e.g. ethylenic double bond or acetylene bond), particularly one ethylenic double bond in order to suppress crosslinking and increase moldability.

As the polymerizable compound having epoxy group as the modifying group, there can be mentioned, for example, glycidyl ethers such as allyl glycidyl ether, chalcone glycidyl ether and the like; glycidyl or epoxy esters such as glycidyl (meth)acrylate, glycidyl vinylbenzoate, glycidyl allylbenzoate, glycidyl cinnamate, glycidyl cinnamylideneacetate, glycidyl ester of dimer acid, ester between epoxidized stearyl alcohol and acrylic acid or methacrylic acid, and the like; and epoxidized unsaturated chain or cyclic olefins such as oxyhexene, limonene oxide and the like.

As the polymerizable compound having carboxyl group as the modifying group, there can be mentioned, for example, aliphatic unsaturated monocarboxylic acids such as acrylic acid, methacrylic acid, propiolic acid, crotonic acid and the like; aromatic unsaturated monocarboxylic acids such as cinnamic acid and the like; aliphatic unsaturated dicarboxylic acids such as maleic acid, fumaric acid, itaconic acid, citraconic acid and the like; unsaturated dicarboxylic acid monoesters such as mono-$C_{1-10}$ alkyl ester of maleic acid, fumaric acid monoester corresponding thereto, and the like. As the polymerizable compound having acid anhydride group as the modifying group, there can be mentioned, for example, maleic anhydride, itaconic anhydride, citraconic anhydride and himic anhydride.

As the polymerizable compound having hydroxyl group as the modifying group, there can be mentioned, for example, allyl alcohol and hydroxyalkyl (meth)acrylates [e.g. 2-hydroxyethyl (meth)acrylate, 2-hydroxypropyl (meth)acrylate and butanediol mono(meth)acrylate].

As the polymerizable compound having amide group as the modifying group, there can be mentioned, for example, (meth)acrylamide, N-substituted (meth)acrylamides [e.g. N,N-dimethylacrylamide] and vinylsulfonamide. Preferable amide groups include N-substituted amide groups wherein a modifying group having no self-condensing property is bonded to the nitrogen atom.

As the polymerizable compound having amino group as the modifying group, there can be mentioned, for example, allyl compounds such as allylamine, diallylamine and the like; and vinyl compounds such as 4-vinylaniline and the like. As the polymerizable compound having isocyanate group as the modifying group, there can be mentioned vinyl isocyanate, methacryloyl isocyanate, etc.

Particularly preferred as the polymerizable compound are (1) ethylenically unsaturated polymerizable compounds having epoxy group, such as glycidyl (meth)acrylate and the like, and ethylenically unsaturated polymerizable compounds having amide bond and epoxy group; (2) ethylenically unsaturated polymerizable compounds having carboxyl group, such as (meth)acrylic acid and the like; and (3) ethylenically unsaturated polymerizable compounds having acid anhydride group, such as maleic anhydride and the like.

The weight-average molecular weight of the modified polyacetal resin is about 2,000 to 500,000, preferably about 2,000 to 400,000, more preferably about 10,000 to 300,000.

The modified polyacetal resin can be obtained by mixing or kneading, with heating (particularly melting), a polyacetal component and a polymerizable compound having modifying group. At that time, a radical-generating agent or an antioxidant may be added as necessary. As the apparatus for mixing or kneading, there can be used, for example, a mixer or a kneader such as ordinary extruder or the like.

The use amount of the polymerizable compound having modifying group can be about 0.1 to 30 parts by weight, preferably about 0.3 to 25 parts by weight, more preferably 0.5 to 20 parts by weight per 100 parts by weight of the polyacetal component.

Meanwhile, the carbodiumide compound used in the present invention is a compound having at least one carbodiimide group in the molecule, and includes a monocarbodiimide compound and a polycarbodiimide compound. The carbodiimide compound can be produced generally by a well known process, for example, by using, as a catalyst, an organic phosphorus compound or an organometal compound and subjecting a polyisocyanate to a decarboxylation-condensation reaction at a temperature of 70° C. or lower in a solvent-free state or in the presence of an inert solvent.

The monocarbodiimide compound can be exemplified by dicyclohexylcarbodiimide, diisopropylcarbodiimide, dimethylcarbodiimide, diisobutylcarbodiimide, dioctylcarbodiimide, tertbutylisopropylcarbodiimide, diphenylcarbodiimide, di-tertbutylcarbodiimide and di-B-naphthylcarbodiimide. Of these, particularly preferred are dicyclohexylcarbodiimide and diisopropylcarbodiimide in view of the commercial availability.

As the polycarbodiimide compound, there can be used those produced by various processes. Basically, there can be used isocyanate-terminated polycarbodiimides produced by conventional processes described in U.S. Pat. No. 2,941,956; JP-B-47-33279; J. Org. Chem. 28, 2069–2075 (1963); and Chemical Review 1981, Vol. 81, No. 4, pp. 619–621. Specifically, there can be used isocyanate-terminated polycarbodiimides produced by a condensation reaction of an organic diusocyanate where carbon dioxide is removed.

As the organic diisocyanate used as a raw material in the above polycarbodiimide production, there can be mentioned, for example, aromatic diisocyanates, aliphatic diisocyanates, alicyclic diisocyanates and mixtures thereof. Specific examples of these diisocyanates are 1,5-naphthylene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, tetramethylxylylene diisocyanate, 2,6-diisopropylphenyl isocyanate and 1,3,5-triisopropylbenzene-2,4-diisocyanate.

In production of a polycarbodiimide from the organic diisocyanate, there can be used a compound (e.g. monoisocyanate) reactive with the terminal isocyanate of polycarbodiimide, in order to obtain a polycarbodiimide having an appropriately controlled polymerization degree.

As the monoisocyanate for controlling the polymerization degree of polycarbodiimide by blocking the terminal of polycarbodiimide, there can be used, for example, phenyl isocyanate, tolyl isocyanate, dimethylphenyl isocyanate, cyclohexyl isocyanate, butyl isocyanate and naphthyl isocyanate.

As the compound reactive with the terminal isocyanate of polycarbodiimide (i.e. blocking agent), there can also be used, for example, aliphatic, aromatic or alicyclic compounds having —OH group (e.g. methanol, ethanol, phenol, cyclohexanol, N-methylethanolamine, polyethylene glycol monomethyl ether and polypropylene glycol monomethyl ether), =NH group (e.g. diethylamine and dicyclohexylamine), —NH$_2$ group (e.g. butylamine and cyclohexylamine), —COOH group (e.g. succinic acid, benzoic acid and cyclohexanoic acid), —SH group (e.g. ethylmercaptan, allylmercapatan and thiophenol), or epoxy group.

The condensation reaction of organic diisocyanate where removal of carbon dioxide takes place, proceeds in the presence of a carbodiimidization catalyst. As the carbodiimidization catalyst, there can be used, for example, phosphorene oxides such as 1-phenyl-2-phosphorene-1-oxide, 3-methyl-1-phenyl-2-phosphorene-1-oxide, 1-ethyl-2-phosphorene-1-oxide, 3-methyl-2-phosphorene-1-oxide, 3-phosphorene derivatives thereof, and the like. Of these, 3-methyl-1-phenyl-2-phosphorene-1-oxide is preferred for the reactivity.

The polyacetal resin composition of the present invention comprises 100 parts by weight of the polyacetal resin and 0.01 to 30 parts by weight, preferably 0.5 to 5 parts by weight of the carbodiimide compound.

The present polyacetal resin composition can further comprise an organic or inorganic fiber as a fibrous reinforcing agent. Such a fiber includes, for example, a carbon fiber and inorganic fibers such as glass fiber, shirasu glass fiber, alumina fiber, silicon carbide fiber, ceramic fiber, asbestos fiber, gypsum fiber, metal fiber and the like.

Further in the present polyacetal resin composition, a granular reinforcing agent may be used. Such a reinforcing agent includes organic or inorganic fillers, for example, silicates (e.g. wollastonite, sericite, kaolin, mica, clay, bentonite, asbestos, talc and aluminosilicate), metal oxides (e.g. alumina, silicon oxide, magnesium oxide, zirconium oxide and titanium oxide), carbonates (e.g. calcium carbonate, magnesium carbonate and dolomite), sulfates (e.g. calcium sulfate and barium sulfate), glass beads, boron nitride, silicon carbide, and silica. The granular reinforcing agent may be hollow (porous).

The above-mentioned reinforcing agents may be used in admixture of two or more kinds and may as necessary be subjected to a pretreatment with a coupling agent of silane type, titanium type or the like. The content of the reinforcing agent used is preferably 5 to 60 parts by weight. When the amount is less than 5 parts by weight, no reinforcing effect is obtained. When the amount is more than 60 parts by weight, the resulting composition gives a molded article of rough surface. Therefore, such amounts are not preferred.

The polyacetal resin composition of the present invention can be obtained, for example, by melt-kneading, in an extruder, the polyacetal resin, the carbodiimide compound and, as necessary, the reinforcing agent.

The temperature of melt-kneading is preferably 170 to 250° C. When the temperature is lower than 170° C, the melting of the polyacetal resin may be insufficient. When the temperature is higher than 250° C., the polyacetal resin may undergo pyrolysis. When the reinforcing agent is used, the polyacetal resin, the polycarbodiumide compound and the reinforcing agent are melt-kneaded in an extruder at a temperature not lower than the melting point of the polyacetal resin.

The melt-kneading can be conducted by using a known apparatus ordinarily used in kneading of resin melt, such as kneader, roll mill, extruder or the like. There are various extruders such as single-screw type, double-screw type, cokneader and the like. Any of these extruders can be used to obtain a composition of the present invention.

The present polyacetal resin composition may furthermore comprise, as necessary, various additives, for example, stabilizers (e.g. anti-oxidant, ultraviolet absorber, amidine compound, oxide or hydroxide of alkali metal or alkaline earth metal, and organic or inorganic salt), light stabilizer, plasticizer, anti-static agent, lubricant, flame-retardant and coloring agent.

In the present polyacetal resin composition, when it is intended to improve the stability of the modified polyacetal resin, it is advantageous to add, for example, an anti-oxidant such as hindered phenol (e.g. phenol type anti-oxidant), hindered amine (e.g. amine type anti-oxidant), other compound (e.g. sulfur type anti-oxidant or phosphorus type anti-oxidant) or the like.

The present invention is described below in more detail by way of Examples. These Examples, however, restrict the present invention in no way.

Synthesis Example 1

500 g of 4,4'-dicyclohexylmethane diisocyanate and 5.0 g of a carbodiumidization catalyst (3-methyl-1-phenyl-2-phosphorene-1-oxide) were reacted at 180° C. for 12 hours to obtain isocyanate-terminated 4,4'-dicyclohexylmethanecarbodiimide having an average polymerization degree of 3.

Synthesis Example 2

590 g of 4,4'-dicyclohexylmethane diisocyanate, 62.6 g of cyclohexyl isocyanate and 6.12 g of a carbodiimidization catalyst (3-methyl-1-phenyl-2-phosphorene-1-oxide) were reacted at 180° C. for 48 hours to obtain 4,4'-dicyclohexylmethanecarbodiimide having an average polymerization degree of 140.

Synthesis Example 3

500 g of 4,4'-dicyclohexylmethane diisocyanate and 5.0 g of a carbodiimidization catalyst (3-methyl-1-phenyl-2-phosphorene-1-oxide) were reacted at 180° C. for 12 hours. Then, 40.0 g of polyethylene glycol monomethyl ether was added, and a reaction was conducted at 120° C. for 3 hours to subject the terminal isocyanate group to urethanization to obtain polyethylene glycol-terminated 4,4'-dicyclohexylmethanecarbodiimide having an average polymerization degree of 5.5.

Synthesis Example 4

500 g of 4,4'-dicyclohexylmethane diisocyanate and 5.0 g of a carbodiimidization catalyst (3-methyl-1-phenyl-2-phosphorene-1-oxide) were reacted at 180° C. for 14 hours. Then, 42 g of cyclohexylamine was added, and a reaction was conducted at 120° C. for 3 hours to subject the terminal isocyanate group to urethanization to obtain cyclohexylurea-terminated 4,4'-dicyclohexylmethanecarbodiimide having an average polymerization degree of 8.

Synthesis Example 5

500 g of isophorone diisocyanate and 5.0 g of a carbodiimidization catalyst (3-methyl-1-phenyl-2-phosphorene-1-oxide) were reacted at 180° C. for 12 hours to obtain isocyanateterminated isophoronecarbodiimide having an average polymerization degree of 10.

Synthesis Example 6

500 g of tetramethylxylylene diisocyanate and 5.0 g of a carbodiimidization catalyst (3-methyl-1-phenyl-2-phosphorene-1-oxide) were reacted at 180° C. for 12 hours to obtain isocyanate-terminated 4,4'-tetramethylxylylenecarbodiimide having an average polymerization degree of 10.

Synthesis Example 7

500 g of 1,3,5-triisopropylbenzene diisocyanate and 5.0 g of a carbodiimidization catalyst (3-methyl-1-phenyl-2-phosphorene-1-oxide) were reacted at 120° C. for 12 hours to obtain isocyanate-terminated triisopropylbenzenecarbodiimide having an average polymerization degree of 5.

Example 1

100 parts by weight of a polyacetal copolymer (a copolymer composed of at least oxymethylene unit and oxyethylene unit) and 3 parts by weight of the carbodiimide synthesized in Synthesis Example 1 were dry-blended, and the blend was extruded from a double-screw extruder having a T-die, at a cylinder temperature of 190 to 210° C. to produce a film. From the film was formed a JIS No. 4 dumbbell by punching, to obtain a dumbbell specimen for tensile test. The specimen and distilled water were placed in a stainless steel pressure container, and the container was allowed to stand in a drier of 140° C. to subject the specimen to a water resistance test. At given time intervals, the specimen was taken out and measured for tensile strength. The results are shown in FIG. 1.

Examples 2 to 10

The operation of Example 1 was repeated except that there was used a given amount of the carbodiimide compound synthesized in one of Synthesis Examples 2 to 7, and measurement of tensile strength was conducted in the same manner as in Example 1. The results are shown in FIG. 1.

Example 11

The operation of Example 1 was repeated except that 30 parts by weight of a glass fiber was added, and measurement of tensile strength was conducted in the same manner as in Example 1. The results are shown in FIG. 1.

Comparative Example 1

The operation of Example 1 was repeated except that no carbodiimide compound was added, and measurement of tensile strength was conducted in the same manner as in Example 1. The results are shown in FIG. 1.

Reference Example (Thermal analysis of present polyacetal resin compositions)

Each of the polyacetal resin compositions produced in Examples 1 to 11 and Comparative Example 1 was subjected to thermal analysis.

In differential scanning calorimetry (DSC), melting point was measured by using Thermal Analyzer System 001 (a product of K. K. Mac Science) and conducting temperature elevation up to 300° C. at a rate of 10° C./min. In differential thermal analysis (TG-DTA), temperature elevation was conducted up to 500 ° C. at a rate of 10° C./min, and temperature at 10% weight decrease was measured. The results are shown in Table 1.

TABLE 1

| | POM (wt. parts) | Carbodimiimide (wt. parts) | Glass fiber (wt. parts) | Melting point (° C.) | Temp. At 10% weight decrease(° C.) |
|---|---|---|---|---|---|
| Ex. 1 | 100 | 3 (Syn. Ex. 1) | | | |
| Ex. 2 | 100 | 3 (Syn. Ex. 2) | | 168 | 288 |
| Ex. 3 | 100 | 3 (Syn. Ex. 3) | | | |
| Ex. 4 | 100 | 3 (Syn. Ex. 4) | | 169 | 285 |
| Ex. 5 | 100 | 3 (Syn. Ex. 5) | | | |
| Ex. 6 | 100 | 3 (Syn. Ex. 6) | | | |
| Ex. 7 | 100 | 3 (Syn. Ex. 7) | | | |
| Ex. 8 | 100 | 0.5 (Syn. Ex. 2) | | | |
| Ex. 9 | 100 | 3 (Syn. Ex. 2) | | | |
| Ex. 10 | 100 | 5 (Syn. Ex. 2) | | | |
| Ex. 11 | 100 | 3 (Syn. Ex. 1) | 30 | | |
| Comp. Ex. 1 | 100 | — | | 166 | 280 |

As shown above, the polyacetal resin composition of the present invention has excellent water resistance at high temperatures and is also improved in heat resistance. Therefore, the present polyacetal resin composition is useful as an engineering plastic.

What is claimed is:

1. A polyacetal resin composition consisting essentially of a polyacetyl resin, a polycarbodiimide compound selected from the group consisting of isocyanate-terminated 4,4'-dicyclohexylmethanecarbodiimide; 4,4'-dicyclohexylmethanecarbodiimide; polyethylene glycol-terminated 4,4'-dicyclohexylmethanecarbo diimide; cyclohexylurea-terminated 4,4'-dicyclohexylmethanecarbodiimide; isocyanate-terminated isoyhoronecarbodiimide and isocyanate-terminated 4,4'-tetramethylxylylenecarbodiimide, and, optionally, a reinforcing agent.

2. A polyacetal resin composition according to claim 1, wherein the content of the polycarbodiimide compound is 0.01 to 30 parts by weight per 100 parts by weight of the polyacetal resin.

* * * * *